3,414,983
PROCESS FOR DRYING CELLULAR COMPOSITIONS

Douglas Bulgin, Birmingham, England, assignor to The Dunlop Company Limited, a British company
No Drawing. Filed Aug. 29, 1966, Ser. No. 575,530
Claims priority, application Great Britain, Aug. 21, 1965, 35,971/65
20 Claims. (Cl. 34—36)

---

ABSTRACT OF THE DISCLOSURE

A process for drying a natural or synthetic rubber cellular composition which comprises heating the cellular composition at a temperature of greater than 120° C. in a non-oxidative atmosphere consisting substantially of a non-oxidative gas.

---

This invention relates to a process for drying cellular compositions such as foamed natural or synthetic rubber compositions.

According to the present invention a process for drying a cellular composition comprises heating the cellular composition at a temperature of greater than 120° C. in a non-oxidative atmosphere consisting substantially of a non-oxidative gas.

The non-oxidative atmosphere is substantially free from oxygen and oxides of nitrogen, and is preferably obtained by the use of an inert gas such as nitrogen or inert gaseous mixtures such as flue gases, e.g. a mixture of nitrogen and carbon dioxide obtained by the combustion of fuels. The cellular composition and non-oxidative atmosphere may be heated directly within an oven or they may be contained in a separate vessel which is contained in and heated by the oven. The atmosphere can conveniently be formed by circulating an inert gas or inert gaseous mixture through the oven or vessel in which the cellular composition is heated, and in this case it is preferred to heat the inert gas or gaseous mixture to the temperature of the oven or vessel prior to circulation of the gas through it. This can be effected by passing the inert gas or gaseous mixture through a coil positioned within the oven, or by the use of a separate heating device. It is preferred to employ a gas pressure within the oven or vessel containing the cellular composition which is greater than atmospheric pressure so that leakage of oxygen or air into the oven or vessel is avoided and the oven or vessel need not be tightly sealed.

If desired, of course, the cellular composition can be heated in a non-circulating, non-oxidative atmosphere but this necessitates the use of efficient sealing means for the oven or vessel containing the cellular composition.

It is to be understood that the terms "inert gas" and "inert gaseous mixture" are used throughout this specification to mean a gas or gaseous mixture which is non-oxidative.

This process enables a cellular composition to be dried at a temperature in excess of the temperature at which it is spontaneously combustible in air or oxygen and, for the purpose of the invention, this temperature is taken as 120° C. The upper temperature limit will in nearly all cases be below the temperature at which the composition pyrolyses or the cellular structure begins to collapse. This upper temperature will usually be less than 240° C. and the temperature at which the cellular composition is heated can conveniently be from 140° C. to 200° C., preferably greater than 160° C.

During heating of the cellular compositions by the process of the present invention, there may be initially a rise in temperature within the cellular composition above the temperature of the oven of up to 10° C. or even 15° C., but this rise in temperature is not sufficient to cause spontaneous combustion of the cellular composition and does not result in any visible change in the cellular composition. This initial rise in temperature is believed to be due to oxidation of the composition by the oxygen which is trapped within the cellular structure of the composition. However, as hereinbefore stated, the rise in temperature is not sufficient to cause visible damage to the cellular composition, and it is not necessary to remove oxygen (or air) from the cells of the cellular composition prior to heating the composition. It may, nevertheless, be advantageous to saturate the cellular composition with the inert gas or inert gaseous mixture prior to heating thereof, to at least partially remove the oxygen from the cellular composition.

The process of this invention is for the removal of water or organic solvents or other substances which wet cellular compositions and whose removal is desirable. The water, organic solvent or other substance may have been introduced at any stage of the formation of the cellular composition or at any time after its formation. Cellular compositions such as foamed natural or synthetic rubber compositions usually contain water and so they are normally dried and cured in a two stage process, the first stage comprising heating the cellular composition to a temperature of up to 100° C. to remove the water and effect partial curing of the composition, and the second stage comprising heating the composition to a temperature of greater than 100° C. to effect final drying and curing of the composition. It has hitherto been a disadvantage that the cellular composition could not be heated in this second stage to a temperature of greater than about 120° C. since at these higher temperatures the rate of oxidation of the cellular composition in air is so great that damage to or spontaneous combustion of the cellular composition results. Consequently, the risk of fire in the drying of cellular compositions at temperatures of greater than 100° C. has hitherto been great.

The present invention overcomes these difficulties and enables a cellular composition to be dried and, if desired, cured by heating the composition to a temperature below that at which the composition pyrolyses or the cellular structure begins to collapse. As hereinbefore stated, temperatures of from 140° C. to 240° C. will usually be employed. The process of the present invention is advantageous in that in addition to reducing the fire risk hitherto associated with the drying of cellular compositions, it enables the cellular compositions to be dried and cured more rapidly than has hitherto been possible. In previous processes, the limitation of the maximum operable temperature to about 120° C. did not allow the use of efficient accelerators such as N-cyclohexyl-2-benzthiazole sulphenamide which does not act at temperatures as low as 120° C. However, the mere fact of employing a higher temperature, even with previously used accelerators, results in a faster cure, for example the time required for curing at 140° C. is about a quarter of the time required for curing at 120° C. using the same accelerator. The physical properties of the dried cellular composition are also enhanced by the use of a higher temperature and the consequent reduction in cure time. The products are non-discoloured by the treatment, showing that substantial oxidation of the cellular material has not occured.

Examples of cellular compositions which can be dried and, if desired, cured by the process of the present invention are those comprising a natural or synthetic rubber or other polymer, for instance, vinyl polymers such as poly(vinyl chloride) or interpolymers of vinyl chloride with vinyl acetate or vinylidene chloride, or both, polyesters, polyamides, polycarbonates, phenolic resins such as phenol-aldehyde resins, urea-aldehyde resins, ethylene-propylene interpolymers with or without a further monomer which confers unsaturation on the interpolymer, polyethylene, polypropylene, polybutadiene, butadiene-styrene interpolymers, butadiene-acrylonitrile interpolymers, polyurethanes or a natural rubber, or blends of any of these polymers.

The dried, cured cellular compositions can be used for a variety of purposes, for example in the manufacture of mattresses, pillows and cushions and for general upholstery purposes. The cellular compositions can be shaped into articles during formation of the cells and the shaped articles can be dried and cured by the process of the present invention. Alternatively, large blocks or sheets of the compositions can be dried and cured, and the dried compositions can subsequently be shaped into articles.

The invention is illustrated by the following example.

Example

A sample of a foamed 75/25 butadiene-styrene copolymer rubber composition (available under the trade name Intex 100) in the form of a cylinder of length 2 inches and diameter 2 inches was suspended in a metal vessel fitted with a close-fitting cover in the centre of which was a $\frac{1}{16}$ inch diameter hole. Nitrogen gas (99.98 percent pure) was passed into the vessel and was allowed to circulate freely around the sample of foam and escape from the top of the vessel through the small hole in the cover. The copper vessel was placed in an oven and heated to a temperature of 200° C. for six hours. Throughout the heating, nitrogen gas was circulated through the vessel at a rate of about 1 litre per minute and the nitrogen was heated prior to pasage into the copper vessel by passing it through a coil positioned in the oven.

The temperature at the centre of the sample of foam rose to about 210° C. and then gradually fell to 200° C., and after 6 hours the sample showed no visible change in appearance.

The above procedure was repeated using a natural rubber foam instead of the foamed butadiene-styrene copolymer rubber composition, and the sample was heated to 160° C. instead of 200° C. After six hours, the sample showed no visible change in appearance, and the temperature at the centre of the sample did not rise above 160° C. at any time.

For purposes of comparison, a sample of the natural rubber foam was heated in an open tin without the passage of nitrogen gas, and this sample became completely destroyed by combustion at a temperature of 145° C.

Also, for purposes of comparison, a 2 by 2 inch cylindrical sample of the aforementioned foamed butadiene-styrene copolymer rubber composition contained in a 500 cc. vessel having a loose-fitting cover was heated to a temperature of about 180° C. for three hours in an air-oven without the passage of nitrogen gas. The sample was not completely destroyed by combustion but it became very dark in colour indicating that substantial oxidation of the composition had occurred due to diffusion of air into the vessel from the oven.

Having now described my invention, what I claim is:

1. A process for drying natural or synthetic rubber a cellular composition which comprises heating the cellular composition at a temperature of greater than 120° C. in a non-oxidative atmosphere consisting substantially of a non-oxidative gas.

2. A process according to claim 1 in which the non-oxidative gas is nitrogen.
3. A process according to claim 1 in which the non-oxidative gas is one of a mixture of non-oxidative gases.
4. A process according to claim 3 in which the mixture of non-oxidative gases comprises nitrogen and carbon dioxide.
5. A process according to claim 1 in which the cellular composition is heated in an oven.
6. A process according to claim 5 in which the cellular composition is contained in a separate vessel within the oven.
7. A process according to claim 5 in which the non-oxidative gas is circulated through the oven.
8. A process according to claim 6 in which the non-oxidative gas is circulated through the vessel.
9. A process according to claim 7 in which the non-oxidative gas is heated to the temperature of the oven before being circulated.
10. A process according to claim 9 in which the non-oxidative gas is heated to the temperature of the oven by passing it through a coil positioned within the oven.
11. A process according to claim 7 in which the pressure in the oven is greater than atmospheric pressure.
12. A process according to claim 8 in which the pressure in the vessel is greater than atmospheric pressure.
13. A process according to claim 1 in which the non-oxidative atmosphere is non-circulating.
14. A process according to claim 1 in which the maximum temperature to which the cellular composition is heated is below the temperature at which the cellular structure begins to collapse.
15. A process according to claim 1 in which the maximum temperature to which the cellular composition is heated is less than 240° C.
16. A process according to claim 15 in which the cellular composition is heated at a temperature of from 140° C. to 200° C.
17. A process according to claim 1 during which the cellular composition is at least partially cured as well as dried.
18. A process according to claim 17 in which the cellular composition is heated to a temperature of up to 120° C. to remove water and effect partial curing of the composition and is then heated to a temperature of greater than 120° C. to effect final drying and curing of the composition.
19. A process according to claim 1 in which the cellular composition is in the form of a shaped article.
20. A process according to claim 1 wherein said cellular composition contains a vulcanization accelerator which is active only at temperatures in excess of 120° C.

References Cited

UNITED STATES PATENTS

| | | | |
|---|---|---|---|
| 2,354,433 | 7/1944 | Carter | 264—50 |
| 2,858,282 | 10/1958 | Fairclough | 264—50 |
| 3,166,385 | 1/1965 | Pahlavouni | 34—36 XR |
| 3,233,016 | 2/1966 | Kracht | 264—53 |
| 3,307,271 | 3/1967 | Simpson | 34—36 XR |
| 3,334,169 | 8/1967 | Erceg et al. | 264—51 |

KENNETH W. SPRAGUE, *Primary Examiner.*